United States Patent [19]

Tuck

[11] Patent Number: 5,262,071
[45] Date of Patent: Nov. 16, 1993

[54] METALWORKING FLUID MANAGEMENT SYSTEM

[75] Inventor: Ira T. Tuck, Mocksville, N.C.

[73] Assignee: W. R. Grace & Co.-Conn., New York, N.Y.

[21] Appl. No.: 20,280

[22] Filed: Feb. 18, 1993

Related U.S. Application Data

[63] Continuation of Ser. No. 817,245, Jan. 6, 1992, abandoned.

[51] Int. Cl.⁵ ............................................. B01D 36/00
[52] U.S. Cl. ............................. 210/805; 210/171; 210/257.1
[58] Field of Search ............... 72/42, 45; 210/805, 210/195.1, 197, 257.1, 168, 171, 172

[56] References Cited

U.S. PATENT DOCUMENTS

| | | | |
|---|---|---|---|
| 2,140,289 | 10/1936 | Hurtt | 80/1 |
| 2,999,597 | 9/1961 | Harms | 210/333 |
| 3,618,707 | 11/1971 | Sluhan | 72/42 X |
| 4,535,615 | 8/1985 | Ebben | 72/39 |
| 5,020,350 | 6/1991 | Knepp et al. | 72/45 |
| 5,090,225 | 2/1992 | Schimion | 72/45 |

FOREIGN PATENT DOCUMENTS

WO90/14624 11/1990 PCT Int'l Appl.

*Primary Examiner*—Frank Spear
*Attorney, Agent, or Firm*—John Dana Hubbard; William L. Baker

[57] ABSTRACT

A system and process for managing metalworking fluids is disclosed. The system has a metering device for supplying desired amounts of metalworking fluid components (coolants, lubricants, biocides, etc.) to the metalworking fluid of the system which has been collected from the metalworking area, and filtered. The use of a variable pump (variable in speed, volume or time) is preferred to ensure that adequate, but not excessive amounts, of the necessary components are added to the system. Preferably, the metering device is located between the outlet of the filter and the inlet of a metalworking operation. The system and process reduce consumption of the metalworking fluid, reduce costs, reduce waste generation, and increase filter performance and overall system control.

9 Claims, 2 Drawing Sheets

METALWORKING FLUID MANAGEMENT SYSTEM

This is a continuation of co-pending application Ser. No. 07/817,25 filed on Jan. 6, 1992, now abandoned.

The present invention relates to a metalworking fluid management system and process for using the system. More particularly, it relates to a management system and process for recycling and reconstituting metalworking fluids.

BACKGROUND OF THE INVENTION

In most metalworking processes, the use of a metalworking fluid is necessary in order to achieve the desired result such as lubrication, cooling, fines removal, etc. Examples of the processes in which these fluids are used include, but are not limited to can making (such as draw and ironing), metal rolling, (such as of aluminum or steel sheets) and punching, sheet bending, etc.

Typically, the processes include the recirculation of spent fluid from the metalworking process through a filtration and equilibration system to remove metal fines, tramp oil, soils, etc. and return the fluid to the metalworking process.

One such system is shown in FIG. 1.

The metalworking station 1 is connected to a sump 2 which collects the spent metalworking fluid. From the sump 2, the fluid is pumped via a conduit 3 to a filtration system 4. The filtration system 4 is comprised of a dirty side 5 and a clean side 6. The coolant is pumped from the dirty side 5 through a filter 7 such as a pleated paper filter, to the clean side 6. The coolant is then pumped via a second conduit 8, to the metalworking process, such as a can making machine.

The fluid concentration is maintained by either adding a premixed supply of fluid or by bulk feeding concentrate of the fluid to the filtration system, generally on the dirty side. Such a supply is shown as 9 in FIG. 1.

This system requires the use of an excessive concentration of fluid in the filtration system. Additionally, the need to maintain high concentrations of the fluid due to losses in the filtration system causes the emulsification of greater amounts of tramp oil and the retention of soils and fines that leads to the premature clogging and replacement of the filter media or cleaning of the filtration system. Moreover, in can making and other metal part manufacture, the higher concentration of fluid causes the fluid, soils and tramp oil to be retained on the finished metal part and the associated tooling which then requires increased cleaning. Lastly, the higher concentration of fluid increases the emulsification level which makes waste more difficult.

SUMMARY AND OBJECTS OF THE INVENTION

The present invention is a system and a process for recirculating a metalworking fluid, such as a coolant or lubricant. The system is formed of a metalworking station, a filtration system and a means for supplying neat concentrations of metalworking fluid between the return from the filtration system and the metalworking station. The means is one or more speed, volume or time variable pumps which draw fluid concentrates, additives and/or water into the system in the desired amounts.

It is an object to provide a system for reconstituting metalworking fluids such as coolants or lubricants.

It is another object of the present invention to provide a process for reconstituting metalworking fluids.

A further object of the present invention is a system for managing metalworking fluids comprising an inlet means on a metalworking station, the inlet means connecting a supply of metalworking fluid to the metalworking station, an outlet means for removing fluid from the metalworking station, the outlet means connecting the metalworking station to a filtration means for filtering the metalworking fluid, and a means for adding metalworking fluid components to the supply, the means for adding components being connected between an outlet means of the filtration means and the inlet means of the metalworking station.

Another object of the present invention is to provide a system for supplying and reconditioning metalworking fluids comprising a first inlet means connecting a supply of reconditioned metalworking fluid to a metalworking station, an outlet means for removing the fluid from the metalworking station, the outlet means connecting the metalworking station to a sump so as to collect spent metalworking fluids, a first pumping means connecting the sump to a filtration area, the filtration area being comprised of a collection area, a filtration means and a retention area, the filtration means being located so as to separate the collection area from the retention area, a second pumping means located adjacent the filtration means for moving metalworking fluid from the collection area through the filtration means to the retention area, an outlet from the retention area to an inlet means of a third pumping means, an outlet means from the third pumping means connected to the first inlet means of the metalworking station, and a means for adding metalworking fluid constituents to the system wherein the means for adding constituents is located between the outlet means of the retention area and the first inlet means of the metalworking station.

An additional object is to provide a system for managing metalworking fluids comprising a metalworking machine having an inlet and an outlet for metalworking fluid, the machine outlet being connected to an inlet of a filter, the filter having an outlet connected to a conduit between the outlet of the filter and the inlet of the metalworking machine, and a metalworking fluid metering device located between the outlet of the filter and the inlet of the metalworking machine, the metering device being comprised of a supply of metalworking fluid constituents, a variable pump and first conduit between the supply and an inlet to the variable pump and a second conduit between an outlet of the pump and the conduit.

A further object is to provide a process of managing metalworking fluids comprising the steps of:

a.) supplying metalworking fluids to a metalworking area;

b.) removing used metalworking fluid from the metalworking area;

c.) filtering the used metalworking fluid;

d.) adding metalworking fluid constituents to the filtered fluid so as to obtain a desired concentration; and e.) returning the metalworking fluid to the metalworking area.

IN THE DRAWINGS

DETAILED DESCRIPTION OF THE INVENTION

Figure 1:
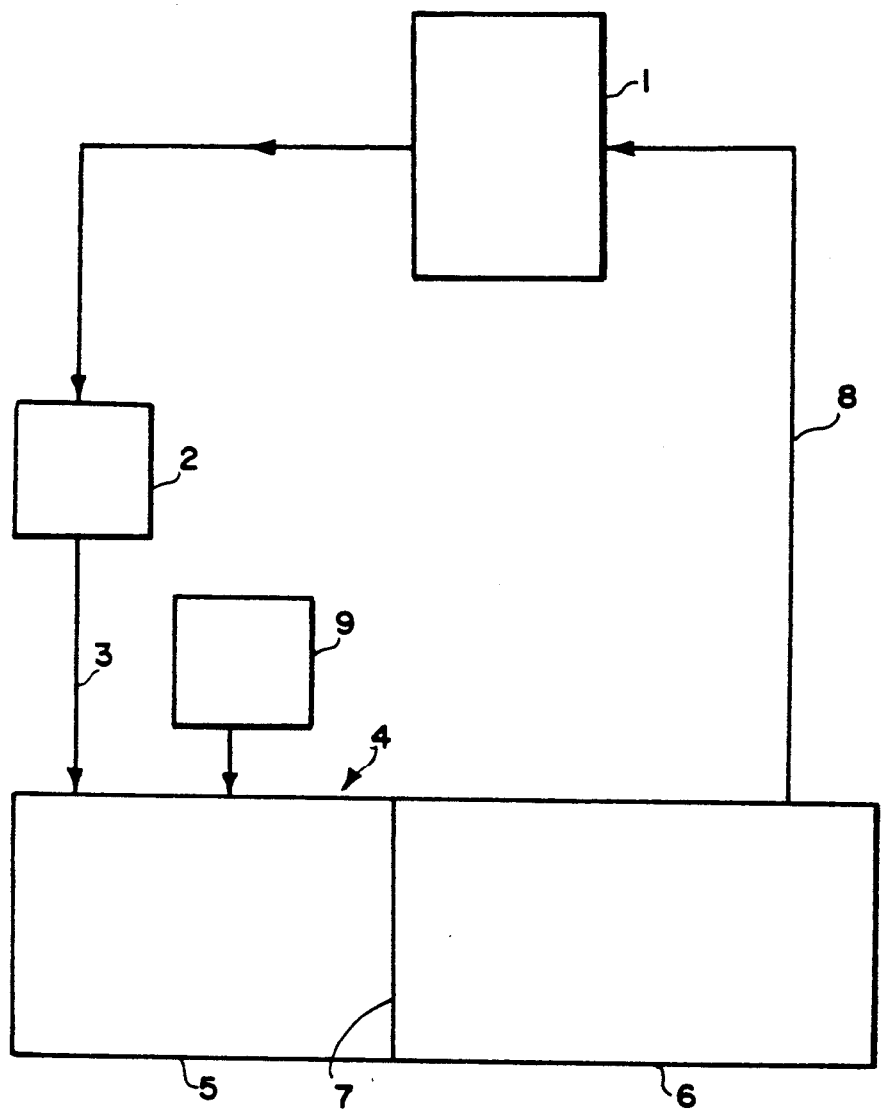
FIG. 1 shows a metalworking fluid recirculation system as is known in the prior art.
Figure 2:
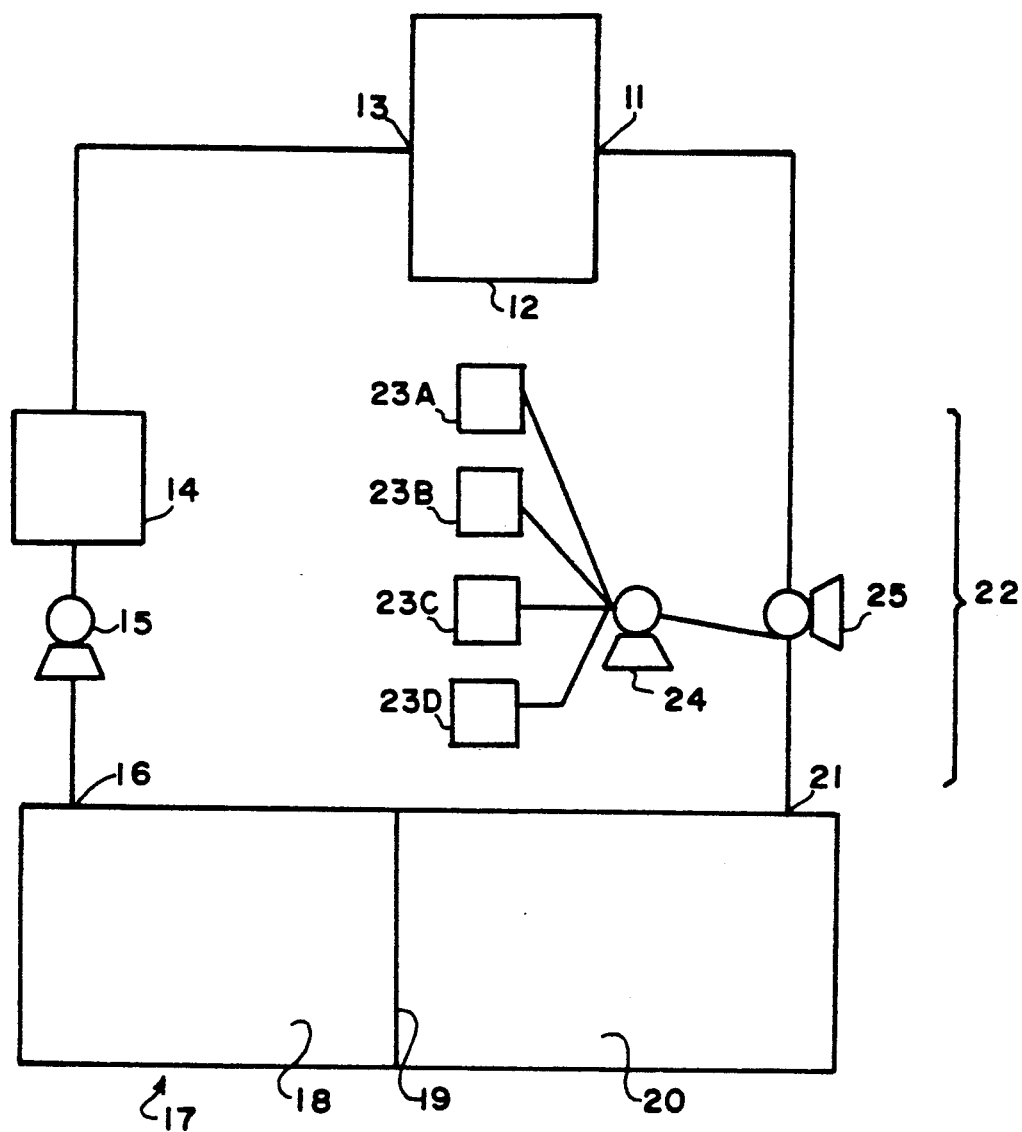
FIG. 2 shows a metalworking fluid system according to the present invention.

In FIG. 2 is a metalworking system according to one embodiment of the present invention. A supply of metalworking fluid is fed into an inlet means 11 of a metalworking station 12. After use in the metalworking station, the fluid exits via an outlet means 13 from the metalworking station 12. Optionally and preferably, the spent fluid is discharged into a collection means such as a sump 14 and then moved by a pumping means 15 to an inlet means 16 of a filtration area 17. The filtration area has a collection area 18 where dirty (unfiltered) fluid is kept and passed through a filtration means 19 to a retention area 20. From outlet means 21 of the filtration area located in the retention area 19, the fluid is returned to the inlet means 11 of metalworking station 12 for reuse.

All components interconnecting the system may either be directed linked together or through a series of pipes or conduits between the adjacent components.

A means for adding metalworking fluid components is shown at 22. It comprises one or more supplies 23 of metalworking fluid components, such as oils, lubricants, coolants, water, biocides, corrosion inhibitors, pH adjusters, etc. which may be stored separately or combined in various combinations. A variable pumping means 24 connects the supply (23A-D) to the system somewhere between the outlet means 21 of the filtration area 17 and the inlet means 11 of the metalworking station 12. Preferably, the means for adding components 21 is located on the inlet means 24 of a system pump 25 which supplies the fluid from the filtration area 17 to the metalworking station 12.

While not shown in FIG. 2, there may be an optional and preferred filtration pumping means which draws the fluid from the collection area 18 through the filtration means 19 to the retention area 20.

All of the individual components are well-known to one skilled in the art and are commercially available.

The following is a description of the major components of the system as described in the present invention.

An important component of the present invention is the pump which supplies the necessary or desired fluid constituents to the system. The selected pump may be variable in speed, volume and/or time, depending upon the desired fluid constituent metered through the pump. Preferably, the pump is speed variable and/or volume variable so that the amount of fluid constituents is added to the system at a desired rate. By being variable, the system operator can simply change the rate as dictated by the parameters of the fluid in the system e.g. if the fluid concentration drops, the pump may be increased to raise the concentration to the desired level. Once obtained, the pump may be slowed to maintain that level.

Such pumps are well-known in the chemical industry. Two preferred pumps are available from First Coast Products, in Jacksonville, Fla. and are known by Model Numbers PP-15-SC-01 or PP-80-SC-01. These pumps are variable speed, self-priming, peristaltic pumps used for metering a variety of chemicals. They may also contain an adjustable programmer that allows one to turn on and off the pump in selected time increments. The pumps are speed adjustable so that the feed rate may be varied as desired.

Where it is desired to add different constituents to the fluid at different rates, it is preferred to use a series of pumps, one for each constituent so as to ensure simple and automatic metering of the desired constituent as required by the system. For example, in a metalworking fluid, one may have a first pump for adding neat concentrations of the fluid (i.e. the fluid has not been mixed with water or a solvent diluent). A second pump may be used to supply a biocide and a third pump may be used to supply a second biocide and/or additional additives such as extreme pressure agents, pH-adjusters, water etc. Different pumps are preferred due to the different application rates of the constituents.

Alternatively, one pump or two pumps could be used with the pump or pumps being connected to the supplies of the different constituents via a series of valves so that the correct constituents are metered through the pump or pumps at the correct time and in the desired amounts.

The filtration means is any filtration device which is commonly used in the metalworking industry for the cleaning and recycling of metalworking fluids.

A typical filtering system used in metalworking is a large tank which is divided into two separate portions. One portion receives the used metalworking fluid which is dirty with metal fines, soils, tramp oils, etc. The other portion retains the filtered metalworking fluid and feeds it back to the system for reuse. Between the two areas (dirty and clean) is the filtering means. It may be part of the tank, such as forming a physical division between the two portions. Alternatively, it may be formed as part of one of the two portions, preferably the dirty or collection portion. In either instance, the fluid is drawn through the filter and into the retention area.

Commonly, the filter is a fibrous sheet material, such as paper (cellulosic, glass or synthetic) or fabric (glass or synthetic) or a mat or felt (glass, cellulosic or synthetic). More preferably, it is a pleated paper type of filter as it is low cost, easy to replace and maintain and provides adequate filtration performance. Such filters are well-known and commonly available in the industry. Other filters may be used as the type of filter, per se, is not critical to the invention. Other well-known filters include metal screens or baskets, centrifuges, coagulation and/or settling tanks, absorbent mops, etc. All of these filters are well-known to one skilled in the art and are useful in the present system.

Any other pumps used in the system may be of the same type as those used in the means for adding fluid constituents to the system. Alternatively, other pumps such as diaphragm pumps, which are commonly traditionally used in fluid circulation systems, may be used.

The tank used for collecting, filtering and retaining the metalworking fluid may be any such tank commonly used in the industry. Typically, such tanks may be formed of metal, such as aluminum, stainless steel or galvanized aluminum, or plastic or fiberglass. They should be of sufficient volume to allow for adequate filtration and retention of an adequate volume of fluid for use in the system.

Additionally, such tanks often contain sensors for measuring fluid levels in order to ensure that sufficient fluid is maintained in the system.

Moreover, various other well-known components typically used in such systems are also useful in the present invention. Such components may include heaters, pressure gauges, water supply junctions, pressure dampeners, check valves, etc.

All or some of the components of the system may be directed connected to the adjacent component. Alternatively, each of the adjacent components may be connected to each other via pipes, tubing or conduits. Such pipes, tubing or conduits may be made from metal, such as copper, aluminum or stainless steel, and plastic, such as polytetrafluoroethylene, polyethylene or polyvinyl chloride. The conduits may be connected to the components via various well-known attachment means, such as threaded fittings, compression fittings, adhesives, etc.

The process of the present invention is as follows:

A supply of metalworking fluid is provided to an inlet of a metalworking station. After use, the fluid exits the station via an outlet and is preferably collected in a sump. The fluid is then preferably pumped from the sump to a filtration system. The fluid is filtered preferably, by pumping it through a filter. Filtered fluid is returned to the metalworking station by pumping the fluid from the filter area to the inlet of the metalworking station via a supply pump. Fluid constituents, such as lubricants, coolants, water, biocides, etc. are metered into the fluid between the filter outlet and the inlet to the metalworking station. Preferably, the components are added to the inlet side of the supply pump to ensure adequate mixing of the components with the filtered fluid before entering the metalworking station.

The system and process for using the system as disclosed in the present invention is useful for a variety of metalworking operations. For example, it is particularly useful in the manufacture of metal cans, in particular two piece cans formed by the draw and ironing process. Additionally, it is useful for the roll forming process for the manufacture of metal sheet stock. Likewise, it is useful in other metalworking processes such as grinding, milling, broaching, stamping, cutting or boring. It is also useful in cleaning applications such as acid or alkaline cleaning systems.

The inventor has found that the present invention provides a number of benefits and overcomes a number of problems which have existed with the prior systems and processes.

For example, it has been shown that the addition of neat (concentrated) fluid components directly into the supply pump intake greatly reduces the amount of fluid consumed in the system. In tests conducted with the system according to the present invention in a can making process, the inventor has found that the amount of metalworking fluid consumed dropped significantly below that used in the prior art system where bulk additions of fluid were added to the filtration system. Further, it was found that the concentration of metalworking fluid components can be reduced up to 35% below that previously used while maintaining, and in most instances improving, the performance of the fluid, the system and the workpiece. Additionally, the inventor found that the filter, especially when using pleated fibrous filters, had improved and prolonged performance over that in the premixed or bulk supply system. It was believed that the filter lasted longer due to the reduced concentration of components, especially emulsified tramp oil, in the fluid as it was filtered.

Additionally, less fluid components were retained by the filter than in the previous system, which was believed to contribute to the reduction in fluid used and the ability to use lower concentrations of fluid (as less was captured by the filter).

The reduction in fluid concentration within the system also allowed for reduced build-up of residue on the tool and/or workpiece.

A reduction in tramp oil levels in the fluid was also noticed. It is believed that this may in part have been caused by the reduction in fluid concentration necessary within the system and by the improved performance and life of the filter. The reduction in tramp oil reduced build up, increased fluid life, improved filtration life, and improved the product consistency.

Lastly, the system provided an improved workpiece. For example, in a draw and ironing process (two piece can making) it was found that the overall variance in canwall thickness was reduced, that less tears or ruptures occurred and that the workpieces required less cleaning than those made by the previous system.

All of these benefits resulted in a lower cost in running and maintaining the system, in reducing the amount of waste generated (either in filter paper or soiled fluid), in reducing the variation in the end work product (thereby reducing rejections) and in reducing cleaning costs (due to less tramp oil and other soils being retained on the workpieces and tooling).

While the present invention has been described in relation to the preferred embodiments, one skilled in the art would be aware of equivalents, alternatives and modifications useful in the present invention. It is intended in the appended claims to cover all such equivalents, alternatives and modifications that fall within the true spirit and scope of the present invention.

What I claim:

1. A system for supplying and reconditioning metalworking fluid comprising a first inlet means connecting a supply of reconditioned metalworking fluid to a metalworking station, an outlet means for removing the fluid from the metalworking station, the outlet means connecting the metalworking station to a sump so as to collect spent metalworking fluids, a first pumping means connecting the sump to a filtration area, the filtration area being comprised of a collection area, a filtration means and a retention area, the filtration means being located so as to separate the collection area from the retention area, a second pumping means located adjacent the filtration means for moving metalworking fluid from the collection area through the filtration means to the retention area, an outlet from the retention area to an inlet means of a third pumping means, an outlet means from the third pumping means connected to the first inlet means of the metalworking station, and a means for adding metalworking fluid constituents to the system wherein the means for adding constituents is located between the outlet means of the retention area and the first inlet means of the metalworking station, and wherein said means for adding metalworking fluid constituents is proximate to said outlet means of said retention area relative to said first inlet means of said metalworking station.

2. The system of claim 1 wherein the metalworking station is a can making machine, the filtration means is selected from the group consisting of fibrous filters, centrifugal filters, coagulation tanks, settling tanks and combinations thereof, and the means for adding metalworking fluids is a variable pump connecting a supply of metalworking fluid constituents to the system.

3. The system of claim 1 wherein the means for adding metalworking fluids and additives is a speed adjustable pump.

4. The system of claim 1 wherein the means for adding metalworking fluids is a volume variable pump.

5. The system of claim 1 further comprising a means for supplying additives to the system, the means for supplying additives having an outlet connected to the system between the outlet means of the retention area and the first inlet means of the metalworking station.

6. A system for managing metalworking fluids comprising a metalworking machine having an inlet and an outlet for metalworking fluid, the machine outlet being connected to an inlet of a filtration area comprised of a collection area, a filter and a retention area, the filter separates the collection area from the retention area, the retention area having an outlet connected to a first conduit between the retention area and the inlet of the metalworking machine, and a metalworking fluid metering device located between the outlet of the retention area and the inlet of the metalworking machine and wherein said metalworking fluid metering device is proximate to said outlet of said retention area relative to said inlet of said metalworking machine, the metering device being comprised of a supply of metalworking fluids constituents, a variable pump and second conduit between the supply and an inlet to the variable pump and a third conduit between an outlet of the variable pump and the first conduit.

7. The system of claim 6 further comprising a sump located between the outlet of the metalworking machine and the filter and a second pump between the sump and the filter.

8. The system of claim 6 wherein the variable pump is speed variable.

9. A method of supplying and reconstituting metalworking fluid comprising the steps of:
  a.) providing a metalworking station having a first inlet means and a first outlet means;
  b.) supplying a metalworking fluid to said first inlet means of said metalworking station;
  c.) removing said fluid from said outlet means of said metalworking station;
  d.) collecting said fluid in a sump connected to said outlet means;
  e.) moving said fluid from said sump to a filtration area, said filtration area comprising a second inlet means, collection area, a retention area, a second outlet means connecting said retention area to said first inlet means, and a filtration means, said filtration means situated so as to separate said collection area from said retention area;
  f.) moving said fluid from said collection area through said filtration means to said retention area;
  g.) removing said fluid from said retention area through said second outlet means;
  h.) providing metalworking fluid constituent addition means between said second outlet means and said first inlet means; and
  i.) adding metalworking fluid constituents to said fluid removed from said second outlet means so as to obtain a desired concentration of said metalworking fluid constituents in said fluid.

* * * * *